United States Patent
Fischer et al.

(10) Patent No.: US 10,471,902 B2
(45) Date of Patent: Nov. 12, 2019

(54) RETAINING DEVICE FOR A STILL OR VIDEO CAMERA IN THE INTERIOR OF A MOTOR VEHICLE

(71) Applicant: Kinetix AG, Glarus (CH)

(72) Inventors: Andreas Wolfgang Fischer, Ammerbuch (DE); Michael Andreas Keller, Freudenstadt (DE); Peter Ackeret, Zurich (CH)

(73) Assignee: KINETIX AG, Glarus (CH)

(*) Notice: Subject to any disclaimer, the term of this patent is extended or adjusted under 35 U.S.C. 154(b) by 0 days.

(21) Appl. No.: 15/304,746

(22) PCT Filed: Apr. 8, 2015

(86) PCT No.: PCT/EP2015/057616
§ 371 (c)(1),
(2) Date: Oct. 17, 2016

(87) PCT Pub. No.: WO2015/155239
PCT Pub. Date: Oct. 15, 2015

(65) Prior Publication Data
US 2017/0225624 A1 Aug. 10, 2017

(30) Foreign Application Priority Data

Apr. 9, 2014 (CH) .......................................... 550/14
Apr. 15, 2014 (CH) .......................................... 581/14
(Continued)

(51) Int. Cl.
*B60R 11/02* (2006.01)
*B60R 7/04* (2006.01)
(Continued)

(52) U.S. Cl.
CPC .......... *B60R 11/0211* (2013.01); *B60R 7/043* (2013.01); *B60R 11/02* (2013.01);
(Continued)

(58) Field of Classification Search
CPC . B60R 11/02; B60R 11/0211; B60R 11/0235; B60R 2011/0017; B60R 11/0217
(Continued)

(56) References Cited

U.S. PATENT DOCUMENTS 5,370,060 A * 12/1994 Wang .................... B60N 3/004
108/149
6,758,521 B2 * 7/2004 Imamura .................. B60N 2/44
248/919
(Continued)

FOREIGN PATENT DOCUMENTS

| CN | 101259837 | 9/2008 |
|---|---|---|
| DE | 20310326 | 11/2003 |

(Continued)

*Primary Examiner* — Eret C McNichols
(74) *Attorney, Agent, or Firm* — Leydig, Voit & Mayer, Ltd (57) ABSTRACT

The invention relates to a retaining device for a still or video camera in the interior of a motor vehicle with a fastening apparatus (5, 5*a*, 5*b*, 5*c*, 5*d*, 5*e*) for attaching the retaining device to a vehicle seat part, such as a backrest (2), headrest (3), or headrest holder (4, 4*a*, 4*b*) of a vehicle seat (1), and a carrier arm (6, 6', 6", 60, 60', 60", 62, 62', 62") which is oriented approximately horizontally and parallel with respect to the broad side of the backrest (2) and at one end of which a holder (7) is arranged for receiving a camera (8), wherein the carrier arm (6, 6', 6", 60, 60', 60", 62, 62', 62") protrudes beyond the vehicle seat part (2, 3, 4, 4*a*, 4*b*) to such an extent that the lens (8*a*) of the camera (8) has an uninterrupted view towards the front in the driving direction and/or towards the rear in the direction counter to the driving direction, and wherein the carrier arm (6, 6', 6", 60, 60', (Continued)

US 10,471,902 B2

Page 2

60", 62, 62', 62") at its other end is connected via a first rotary joint (6a) with an approximately vertically-oriented rotational axis Z2 to the fastening device (5, 5a, 5b, 5c, 5d, 5e) and can be pivoted in an approximately horizontal plane.

25 Claims, 6 Drawing Sheets

(30) Foreign Application Priority Data

| | | |
|---|---|---|
| Apr. 27, 2014 | (CH) | 632/14 |
| May 13, 2014 | (CH) | 732/14 |
| Nov. 20, 2014 | (CH) | 1793/14 |

(51) Int. Cl.

| | |
|---|---|
| *B60R 11/04* | (2006.01) |
| *F16M 11/10* | (2006.01) |
| *F16M 11/20* | (2006.01) |
| *F16M 13/02* | (2006.01) |
| *G03B 17/02* | (2006.01) |
| *G03B 17/56* | (2006.01) |
| *B60R 11/00* | (2006.01) |
| *B60N 2/90* | (2018.01) |

(52) U.S. Cl.
CPC ...... *B60R 11/0217* (2013.01); *B60R 11/0235* (2013.01); *B60R 11/04* (2013.01); *F16M 11/10* (2013.01); *F16M 11/2014* (2013.01); *F16M 11/2092* (2013.01); *F16M 13/02* (2013.01); *G03B 17/02* (2013.01); *G03B 17/561* (2013.01); *B60N 2/90* (2018.02); *B60N 2002/905* (2018.02); *B60R 2011/0012* (2013.01); *B60R 2011/0017* (2013.01); *B60R 2011/0085* (2013.01); *B60R 2011/0087* (2013.01); *B60R 2011/0089* (2013.01)

(58) Field of Classification Search
USPC .......................................... 348/148; 224/275
See application file for complete search history.

(56) References Cited

U.S. PATENT DOCUMENTS

| | | | |
|---|---|---|---|
| 7,040,699 B2 | 5/2006 | Curran et al. | |
| 8,561,863 B2 | 10/2013 | Lacolla et al. | |
| 8,678,680 B1 | 3/2014 | Pelini | |
| 8,931,635 B2* | 1/2015 | Bell | A45C 11/00 206/320 |
| 9,278,648 B2* | 3/2016 | Ackeret | B60R 11/0235 |
| 2002/0175254 A1 | 11/2002 | Lee | |
| 2006/0032996 A1* | 2/2006 | Wu | A47C 7/72 248/218.4 |
| 2011/0155873 A1* | 6/2011 | Montag | B60R 11/02 248/218.4 |
| 2012/0006870 A1* | 1/2012 | Proctor | B60R 11/02 224/275 |
| 2012/0313404 A1* | 12/2012 | Ackeret | B60N 3/002 297/163 |
| 2013/0068809 A1* | 3/2013 | Wang | B60R 11/02 224/275 |
| 2014/0202885 A1* | 7/2014 | Bell | A45C 11/00 206/37 |
| 2015/0237750 A1* | 8/2015 | Yang | H05K 5/0234 206/45.2 |
| 2017/0324924 A1* | 11/2017 | Tranchina | H04N 5/64 |

FOREIGN PATENT DOCUMENTS

| | | |
|---|---|---|
| DE | 202006015442 | 11/2003 |
| DE | 202008010276 | 12/2008 |
| WO | 2012059979 | 5/2010 |
| WO | 2011101083 | 8/2011 |

* cited by examiner

RETAINING DEVICE FOR A STILL OR VIDEO CAMERA IN THE INTERIOR OF A MOTOR VEHICLE

The invention relates to a retaining device for a still or video camera in the interior of a motor vehicle.

Cameras, especially video cameras, are very popular and are used for many purposes, especially sports. The cameras are of very compact design and very light and produce high-quality films, which are either stored in the camera and viewed later or can be transmitted "live" to an appropriately equipped monitor.

For vehicles also, such cameras, arranged in the interior or on the outside, are used, for example, for recording traffic situations as evidence of endangerment or accidents, or for photographing exciting journeys and beautiful areas.

Such cameras are usually fastened with suction cups to the inside of windshields or with screw connections to frame or interior paneling parts of the vehicle.

This is expensive, and, depending upon the fastening location, allows only certain objects to be photographed. In addition, there is a risk of injury to passengers in the event of accidents.

WO 01/70539 teaches a camera retaining device that is fastened to a headrest holder.

The goal of the invention is to create a retaining device for a still or video camera in the interior of a motor vehicle that can be installed and removed rapidly in different vehicles and can be adjusted for many types of pictures of various objects. In addition, the retaining device should protect the camera from damage and contamination and protect the passengers from injuries in the event of accidents.

This aim is achieved by a retaining device for a still or video camera in the interior of a motor vehicle with the features of claim 1. Further developments of the invention are defined in the dependent claims.

According to the invention, it is possible, in particular, to fasten the retaining device to vehicle seat parts such as a backrest, headrest, or headrest holder of a vehicle seat for a driver or passenger and to position the camera by rotating the carrier arm around a rotary joint with a vertically-oriented rotational axis in various positions on both sides of the vehicle seat. This allows versatile use of the camera for interior and exterior photography—for example, for monitoring children on the back seats or the "blind spot" in the rear view mirror, or for photographs through the windshield with simultaneous observation of the driver and instruments.

In a preferred embodiment, the retaining device is attached to the headrest post of a headrest holder, and the carrier arm is connected to the fastening device via a rotary joint with a vertically-oriented rotational axis.

In an additional preferred embodiment, the fastening device and the carrier arm are connected via a double joint with a first rotary joint with a rotational axis oriented horizontally and parallel to the plane of the backrest and a second rotary joint with a vertically-oriented rotational axis, so that the rotational axis of the second rotary joint can be vertically oriented, even if the backrest is tilted. Instead of a double joint, a ball-and-socket joint may also be provided.

In a preferred further embodiment, the vertically-oriented rotational axis of the double joint is arranged approximately in the center relative to the vehicle seat part, and the carrier arm is pivotable in an approximately horizontal plane through about 180° between two end positions in which the carrier arm with its longitudinal axis is oriented approximately parallel to the broad side of the backrest. This enables the use of the retaining device on left and right vehicle seats, as well as pivoting the camera to the left or right side of the seat.

In a preferred further development, the carrier arm can be fastened in the two end positions and optionally in intermediate positions—especially the 90° middle position—and can be unlatched with a release button. In addition, a friction brake is advantageously provided for the movement of the carrier arm between the lock-in positions.

In a further preferred embodiment, a height offset or a variable height adjustment mechanism is provided on carrier arm, on the rotary joint, or on the mount, so that the camera (optionally, adjustably) is positioned higher than the fastening apparatus.

It is also advantageous if the length of the carrier arm is adjustable.

In an additional preferred embodiment, the carrier arm is connected to the fastening apparatus via a coupling. This coupling preferably comprises a retaining bushing arranged in or on the vehicle seat part and a receptacle arranged on the carrier arm into which the retaining bushing is plugged and which is secured with a manually releasable locking system. In this, the rotary joint is preferably arranged between the carrier arm and the receptacle.

In a preferred further development, the retaining bushing is arranged on a carrier that is fastened to one or two headrest posts of a headrest holder.

In a preferred further development, the receptacle and the carrier arm can be rotated around the rotary joint into a space-saving storage position.

In an additional preferred embodiment, the holder is connected to the carrier arm via a double joint or a ball-and-socket joint, so that the holder can be rotated around a vertically-oriented rotational axis and inclined around a horizontally-oriented swivel axis. Preferably, the adjustments are lockable by way of friction brakes.

In an additional preferred embodiment, the holder comprises a protective housing in which the camera is mounted. Preferably, the protective housing is accessible via an opening—optionally closeable with a lid—and provided with retaining means for various cameras. Preferably, additional openings for the lens and operating elements for the camera are provided on the protective housing.

In a further preferred embodiment, the carrier arm is connected to the holder with a first double joint with rotational axes oriented perpendicularly to one another with the fastening apparatus and with a second double joint with rotational axes oriented perpendicularly to one another, wherein, in each of the double joints, one rotational axis moves vertically and one rotational axis moves horizontally and wherein the two horizontally-oriented rotational axes travel in parallel. Ball-and-socket joints may also be used in place of double joints.

In an additional preferred embodiment, the carrier arm can also be connected with the fastening apparatus and with the holder via four-link suspension systems, so that when the slope of the carrier arm is moved, the holder remains horizontally oriented.

Naturally, friction-locking or form-locking brakes or latching devices—for example, with teeth and set screws or spring-loaded release buttons—may be arranged on all joints.

Additional advantages and embodiments of the invention will be shown by the description and the attached drawings.

Naturally, the above-named features and those that will be explained in the following can be used not only in the combination presented in the given case, but also in other combinations or by themselves, without falling outside of the scope of the present inventions. This is also true, in particular, for the features of the six embodiments described in the following, which can also be combined with one another in various ways, depending upon the application and space conditions.

In the following, the invention will be explained in further detail based upon preferred embodiments, with reference to the corresponding drawings.

FIG. 7 shows a fourth embodiment of the retaining device with an extendable carrier arm, connected in each case via a joint with a horizontal rotational axis with the receptacle and the holder, in a folded-up storage position with the carrier arm drawn in.

Figure 1:
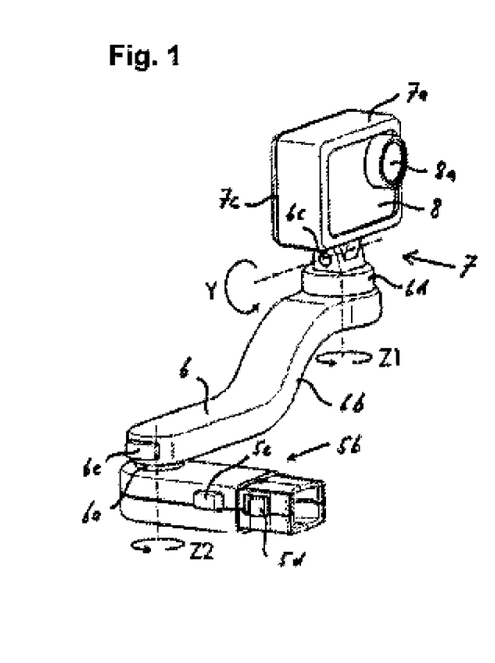
FIG. 1 shows a perspectival view of a first embodiment of the retaining device with the camera placed in the holder.
Figure 2:
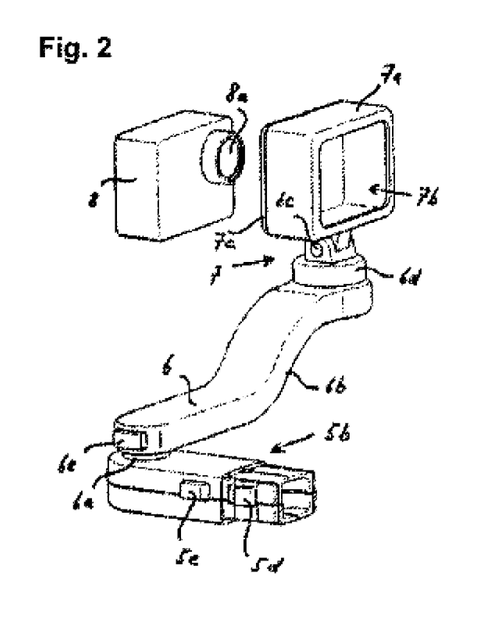
FIG. 2 shows a perspective view of the retaining device according to the representation in FIG. 1 with the camera removed from the holder.
Figure 3:
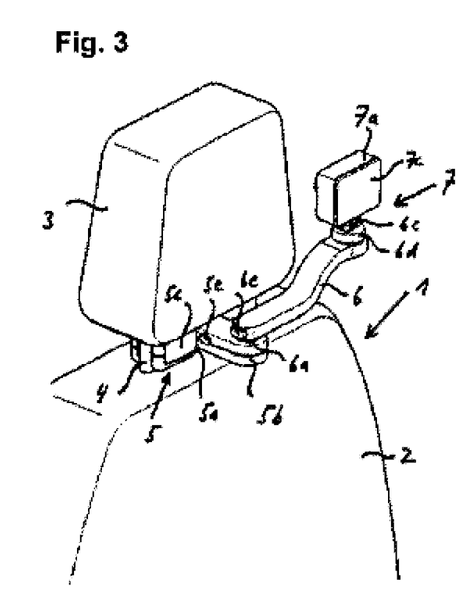
FIG. 3 shows a perspective view of the retaining device fastened to the headrest holder with a fastening apparatus according to the representation in FIG. 1 in the first end position of the carrier arm.
Figure 4:
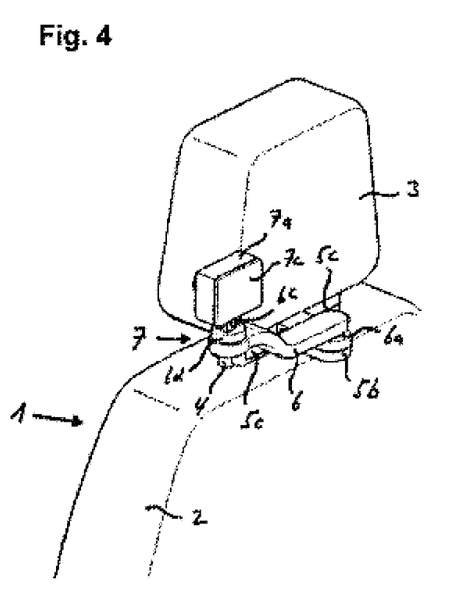
FIG. 4 shows a perspective view of the retaining device fastened to the headrest holder with a fastening apparatus according to the representation in FIG. 1 in the second end position of the carrier arm.

FIGS. 1 and 2 show a first embodiment of the retaining device without fastening apparatus on the vehicle seat. At one end of the carrier arm 6, the receptacle 5b is connected to the carrier arm 6 via a first rotary joint 6a. The rotational axis Z2 of the first rotary joint 6a is approximately vertically oriented, so that the carrier arm 6 is pivotable through about 180° in an essentially horizontal plane between its two end positions (FIGS. 3 and 4). In the two end positions, the carrier arm 6 and the receptacle 5b enclose an angle of about 90° in each case and are blocked with a locking mechanism (not shown). This locking mechanism can be unlocked by way of the release button 6e. For space-saving storage, the receptacle 5b and the carrier arm 6 can be pivoted one above the other.

At the other end of the carrier arm 6 is the holder 7 for receiving the camera 8. The holder 7 comprises a protective housing 7a in which the camera 8 is received. The protective housing 7a is intended, on the one hand, to protect the camera 8 from damage and soiling and, on the other hand, to protect the passengers from possible injury in the event of accidents.

The protective housing 7a is connected, via a double joint 6c, 6d with rotational axes Z1 and Y positioned perpendicularly to one another, with the carrier arm 6 and can be pivoted with the camera 8 through 360° around the vertical rotational axis Z1 and inclined in the desired position around the horizontal rotational axis Y.

The rear wall 7c of the protective housing 7a can be opened to insert and remove the camera 8. In the opposite front wall, an opening 7b is provided, through which the lens 8a of the camera 8 extends and the operating controls of the camera 8 are accessible. The edges of the camera 8 are covered all around by the protective housing 7a, and, in this way, the passengers are protected from injuries in the event of an accident.

On the carrier arm 6, a height offset 6b is provided, so that the end on which the holder 7 is arranged is higher than the end to which the receptacle 5b is linked.

FIGS. 3 and 4 show how the retaining device described in FIGS. 1 and 2 can be fastened to a vehicle seat 1.

To the headrest posts of the headrest holder 4 arranged between the backrest 2 and the headrest 3 a carrier 5c is fastened, with a retaining bushing 5a arranged in the center, and, into this, the receptacle 5 is inserted and can be latched with the engagement hook 5d. The latching can be released via the unlatching buttons 5e positioned on both sides of the receptacle 5b, and the receptacle 5b drawn out of the retaining bushing 5a.

The carrier 5c can be fastened in front or from behind to the headrest 4, so that the retaining device can be arranged on the front or back side of the backrest 2, as needed.

Figure 5:
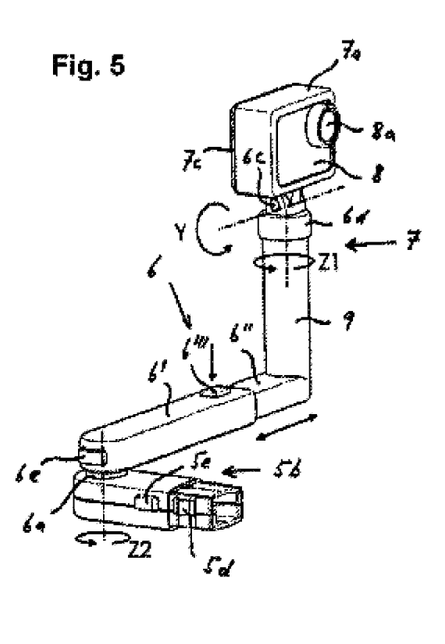
FIG. 5 shows a perspective view of a second embodiment of the retaining device with a carrier arm of adjustable length.

FIG. 5 shows a second embodiment of the retaining device with a carrier arm 6', 6" of adjustable length, comprising a first segment 6' which is connected to the receptacle 5b via the first rotary joint 6a and a second segment 6", which is held telescopically in the first segment 6'.

The two segments 6', 6" can be fixed in the desired position with a locking device (not shown), wherein a release button 6'" is provided for releasing the lock.

At the end of the second segment 6", a supporting element 9 extending vertically upward is arranged, on the upper end of which the double joint 6d, 6c of the holder 7 is arranged.

In this way, the carrier arm 6', 6" and the supporting element 9 with the holder 7 can be drawn out continuously to the desired length and fastened releasably.

Figure 6:
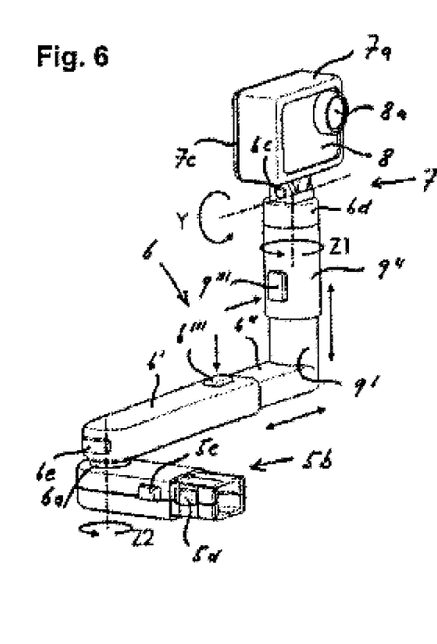
FIG. 6 shows a third embodiment of the retaining device with a carrier arm of adjustable length and a supporting element of adjustable height.

FIG. 6 shows a third embodiment of the retaining device with a carrier arm 6', 6" of adjustable length according to the embodiment in FIG. 5 and a supporting element 9', 9" of adjustable height, comprising a first segment 9' extending vertically upward at the end of the second segment 6" of the carrier arm 6', 6" and a second segment 9" carried within the first segment 9' in a telescoping manner.

The two segments 9', 9" can be fixed in the desired position with a locking device (not shown), wherein a release button 9'" is provided for releasing the lock.

In this way, the supporting element 9', 9", and with it, the holder 7 arranged at the upper end of the second segment 9", can be drawn out continuously to the desired height and fastened releasably.

Figure 7:
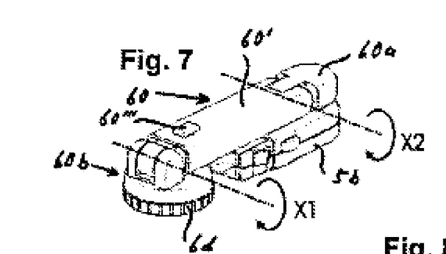
Figure 8:
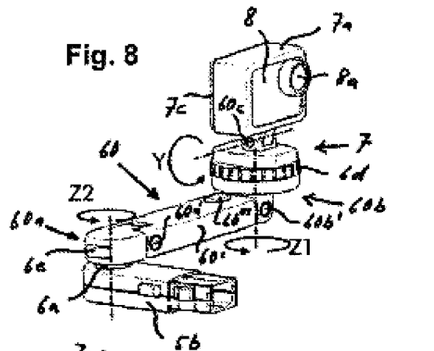
FIG. 8 shows the retaining device according to the representation in FIG. 7 in an extended operating position with the carrier arm retracted in a horizontal operating position, with a camera inserted in the holder.
Figure 9:
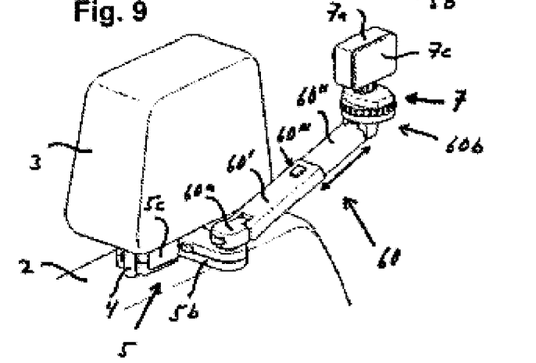
FIG. 9 shows the retaining device according to the representation in FIG. 8 with a fastening apparatus arranged on a vehicle seat, with the carrier arm extended in an oblique operating position.

FIGS. 7 through 9 show a fourth embodiment of the retaining device, with an extendable carrier arm 60, 60', 60" which is connected via a double joint 60a with the receptacle 5b and via a double joint 60b with the holder 7.

The double joint 60a comprises the first rotary joint 6a with vertically-oriented rotational axis Z2 and the rotary joint 60a' with horizontally-oriented rotational axis X2.

The double joint 60b comprises the first rotary joint 6d with vertically-oriented rotational axis Z1 and the rotary joint 60b' with horizontally-oriented rotational axis X1.

The two horizontally-oriented rotational axes X1 and X2 of the joints 60b' and 60a' proceed in parallel to one another.

The rotary joint 6d is formed as a round platform, the lateral surface of which has ribbing and, optionally, a scale for adjusting the angle of rotation.

On the platform of the rotary joint 6d, the protective housing 7a is arranged inclinably for receiving the camera 8 via the rotary joint 60c.

The carrier arm 60 comprises the two segments 60' and 60", telescoping one inside the other, which can be fixed in a desired extended position with a latching device (not shown) and released with the release button 60'''.

For space-saving storage, the receptacle 5b and the carrier arm 60 in its retracted state can be pivoted one above the other around the first rotary joint 6a, and the holder 7 can be pivoted downward through 180° around the rotary joint 60b' (FIG. 7).

Figure 10:
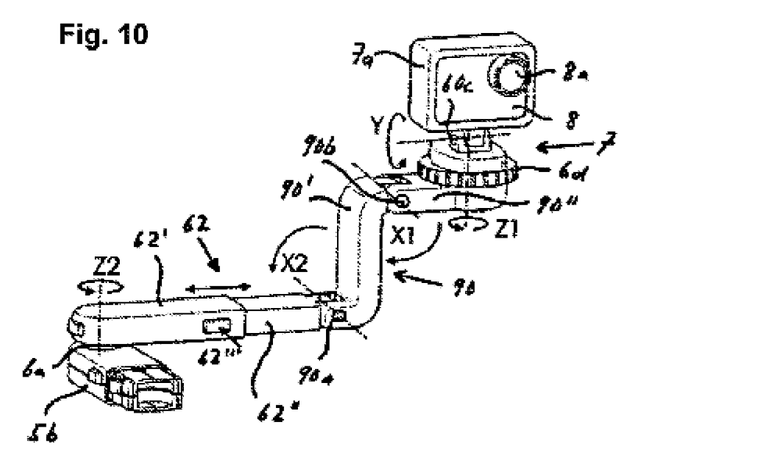
FIG. 10 shows a fifth embodiment of the retaining device with an extendable carrier arm and a supporting element articulated on the carrier arm and a carrier platform articulated on the supporting element for mounting in the operating position.
Figure 11:
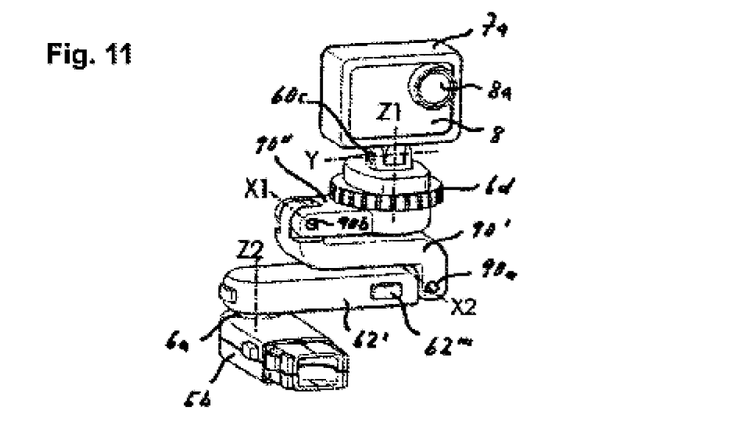
FIG. 11 shows the retaining device according to the representation in FIG. 11 in a folded-up storage position.

FIGS. 10 and 11 show a fifth embodiment of the retaining device. The carrier arm 62 comprises a first segment 62' and a second segment 62" inserted telescopically in the first segment 62', which can be adjusted after pressing the release button 62'''.

The first segment 62' is connected via the first rotary joint 6a with vertical rotational axis Z2 with the receptacle 5b, and the second segment 62" is connected at the front end via a second rotary joint 90a with horizontal rotational axis X2 with the lower end of the essentially vertically-oriented first segment 90' of the supporting element 90 (FIG. 10).

At the upper end of the first segment 90', over a third rotary joint 90b with horizontally rotational axis X1, a second essentially horizontally-oriented segment 90" is arranged, forming a platform for the holder 7 (FIG. 10).

The rotational axes X1 of the third rotary joint 90b and X2 of the second rotary joint 90a run parallel to one another, so that the first and the second segments 90', 90" of the supporting element 90 and the carrier arm 62 can be folded one above the other in parallel (FIG. 11).

The second rotary joint 90a and the third rotary joint 90b are designed as friction joints, and the angle of aperture of 90° is limited by limit stops.

Figure 12:
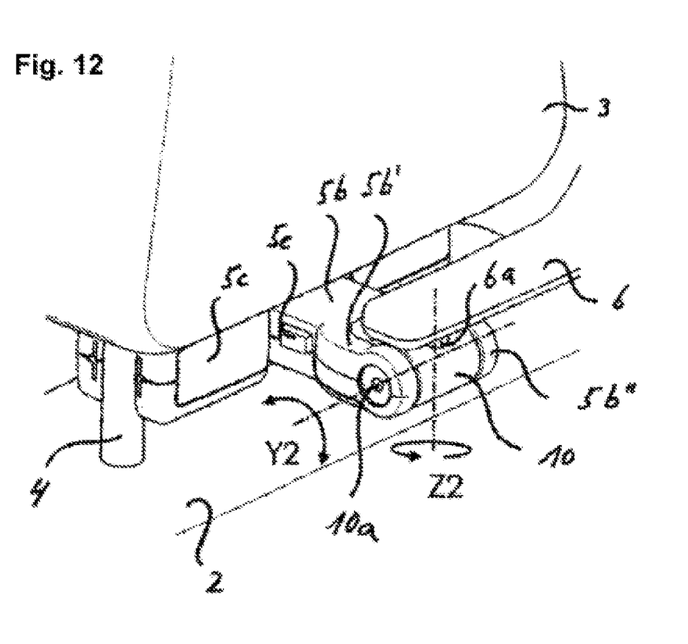
FIG. 12 shows a perspective view of the fastening device with inserted receptacle and a double joint via which the carrier arm is connected to the receptacle.

FIG. 12 shows a connection between the receptacle 5b, 5b', 5b" and the carrier arm 6 over a double joint 10. The double joint 10 comprises the first rotary joint 6a with vertically-oriented rotational axis Z2 and a second rotary joint 10a with horizontally-oriented rotational axis Y2.

The second rotary joint 10a is mounted in a fork 5a', 5b" arranged at the end of the receptacle 5b and provided with a friction brake (not shown), so that continuous adjustment of the vertical orientation of the rotational axis Z2 of the first rotary joint (6a) to the angle of the backrest (2) is guaranteed.

What is claimed is:

1. A system, comprising a retaining device, the system further comprising a vehicle seat positioned in an interior of a motor vehicle, the vehicle seat having:
    a vehicle seat part comprising at least one of a backrest, a headrest, and a headrest holder; the retaining device having a fastening apparatus which releasably attaches the retaining device to the headrest holder; the fastening apparatus comprising a carrier, a receptacle extending in a horizontal plane perpendicular to the carrier, a retaining bushing and an engagement hook, wherein the receptacle is inserted and latched into the retaining bushing via the engagement hook and can be released via at least one unlatching button positioned on either side of the receptacle;
    a carrier arm which is oriented approximately horizontally and parallel with respect to a broad side of the backrest and at a free end of which a holder is arranged for receiving a camera, wherein the carrier arm protrudes beyond the vehicle seat part to such an extent that a lens of a camera mounted to the free end of the carrier arm has an uninterrupted view towards the front in the driving direction and/or towards the rear in the direction counter to the driving direction, characterized in that the carrier arm at its other end is connected via a first rotary joint with an approximately vertically-oriented rotational axis to the fastening apparatus and can be pivoted in an approximately horizontal plane, wherein the rotational axis is arranged approximately in the center with respect to the width broad side of the backrest, and the carrier arm is pivotable between a first position and a second position via the first rotary joint through about 180° around the rotational axis and, in the first and second positions, is oriented approximately parallel with respect to the broad side of the backrest, such that a camera mounted to the free end of the carrier arm can be pivoted to one of a first side or a second side of the vehicle seat part; wherein in the first position, the carrier arm extends perpendicular to the fastening apparatus on a first side of the fastening apparatus and in the second position, the carrier arm extends perpendicular to the fastening apparatus on a second side of the fastening apparatus, and the carrier arm is rotatable between the first and second position via the first rotary joint.

2. The retaining device according to claim 1, characterized in that the carrier arm is releasably lockable, in at least one of end positions and/or a middle position of 90° in the rotational axis of the first rotary joint.

3. The retaining device according to claim 1, characterized in that, between the first rotary joint and the fastening apparatus, a second rotary joint with a rotational axis oriented approximately horizontally and parallel to a plane of the backrest is provided, with which the rotational axis of the first rotary joint can be aligned perpendicularly when the backrest is in an inclined position.

4. The retaining device according to claim 3, characterized in that the first rotary joint with the vertically-oriented rotational axis and the second rotary joint with the horizontally-oriented rotational axis form a double joint.

5. The retaining device according to claim 4, characterized in that a free end of the receptacle is a fork in which the second rotary joint is mounted.

6. The retaining device according to claim 1, characterized in that the carrier arm has a height offset, such that the holder is located higher than the fastening apparatus.

7. The retaining device according to claim 1, characterized in that a length of the carrier arm is adjustable.

8. The retaining device according to claim 7, characterized in that the carrier arm comprises a first segment and a second segment guided in or on the first segment, which is lockable at a desired extension length and releasable via a release button.

9. The retaining device according to claim 1, characterized in that the retaining bushing is arranged in or on the backrest approximately in the center.

10. The retaining device according to claim 1, characterized in that the retaining bushing is arranged in or on the carrier arranged on the headrest holder.

11. The retaining device according to claim 10, wherein the carrier is fastened to two headrest posts of the headrest holder, and the retaining bushing is arranged approximately centrally between the two headrest posts.

12. The retaining device according to claim 1, wherein the holder is connected over a double joint having rotational axes to the carrier arm and can be fastened in a desired position.

13. The retaining device according to claim 12, wherein the holder is pivotable around a vertically-oriented rotational axis of the rotational axes and can be inclined around a horizontally-oriented swivel axis of the rotational axes.

14. The retaining device according to claim 1, wherein an approximately vertically-oriented supporting element is provided between the carrier arm and the holder, so that the holder is higher than the fastening apparatus.

15. The retaining device according to claim 14, wherein the supporting element comprises a first segment and a second segment carried in or on the first segment, the second segment can be fastened at a desired extension height and released via a release button.

16. The retaining device according to claim 14, wherein the supporting element comprises a first segment connected at one end via a first rotary joint with the carrier arm and a second segment connected via a second rotary joint with an other end of the first segment, and wherein the holder is arranged on the second segment.

17. The retaining device according to claim 16, in which rotational axes of the first rotary joint and the second rotary joint are oriented horizontally and parallel to one another, so that the first segment and the second segment and the carrier arm can be folded together in parallel, one above the other.

18. The retaining device according to claim 1, wherein the camera is connected via a releasable coupling with the holder.

19. The retaining device according to claim 1, wherein the holder comprises a protective housing for receiving the camera.

20. The retaining device according to claim 19, wherein the protective housing comprises a releasable fastening apparatus for the camera.

21. The retaining device according to claim 19, wherein, on the protective housing, openings for the lens and operating elements of the camera are provided.

22. The retaining device according to claim 1, wherein the carrier arm and the receptacle can be pivoted around the rotational axis of the first rotary joint in a space-saving storage arrangement.

23. The retaining device according to claim 1,
wherein the carrier arm via a first double joint having rotational axes oriented perpendicularly to one another is connected to the fastening apparatus and via a second double joint having rotational axes oriented perpendicularly to one another to the holder,
wherein one of the rotational axes of each of the first double joint and the second double joint are oriented in parallel to one another, and
wherein the first double joint comprises the first rotary joint and the rotational axes comprises the rotational axis of the first rotary joint.

24. The retaining device according to claim 23, wherein the double joints are formed by ball-and-socket joints.

25. The retaining device according to claim 23, wherein the carrier arm is connected via a four-link suspension system with the fastening apparatus and with the holder, so that the holder remains horizontally oriented when an inclination of the carrier arm is changed.

\* \* \* \* \*